US007640128B2

(12) United States Patent
Moriarty et al.

(10) Patent No.: US 7,640,128 B2
(45) Date of Patent: Dec. 29, 2009

(54) ROTOR POSITION DETECTION IN AN ELECTRICAL MACHINE

(75) Inventors: Peter Mark Moriarty, Knaresborough (GB); Michael Leo McClelland, Leeds (GB); Michael Paul Tankard, Harrogate (GB)

(73) Assignee: Switched Reluctance Drives Limited, Harrogate, North Yorkshire (GB)

( * ) Notice: Subject to any disclaimer, the term of this patent is extended or adjusted under 35 U.S.C. 154(b) by 161 days.

(21) Appl. No.: 11/159,943

(22) Filed: Jun. 23, 2005

(65) Prior Publication Data

US 2006/0009936 A1 Jan. 12, 2006

(51) Int. Cl.
*G06F 19/00* (2006.01)
(52) U.S. Cl. ...................................................... 702/94
(58) Field of Classification Search .................... 702/94, 702/150; 33/320; 212/150
See application file for complete search history.

(56) References Cited

U.S. PATENT DOCUMENTS

| | | | |
|---|---|---|---|
| 4,216,419 A | 8/1980 | Van Dam et al. | |
| 4,972,333 A | 11/1990 | Ishikawa | |
| 5,170,365 A | 12/1992 | Collopy et al. | |
| 5,225,746 A | 7/1993 | von der Heide et al. | |
| 5,467,025 A * | 11/1995 | Ray | 324/772 |
| 5,786,646 A | 7/1998 | Newberg et al. | |
| 5,821,648 A * | 10/1998 | Allinson | 310/68 B |
| 5,877,568 A | 3/1999 | Maes et al. | |
| 6,147,626 A | 11/2000 | Sakakibara | |
| 6,586,903 B2 * | 7/2003 | Moriarty | 318/701 |
| 6,661,140 B2 | 12/2003 | Agnes et al. | |
| 6,826,499 B2 | 11/2004 | Colosky et al. | |
| 2001/0004196 A1 * | 6/2001 | Marcinkiewicz | 318/727 |
| 2001/0010453 A1 * | 8/2001 | Marcinkiewicz | 318/727 |
| 2002/0125852 A1 | 9/2002 | McClelland et al. | |
| 2002/0193935 A1 | 12/2002 | Hashimoto et al. | |
| 2006/0005605 A1 | 1/2006 | Moriarty | |
| 2006/0036384 A1 | 2/2006 | Moriarty et al. | |
| 2006/0036385 A1 | 2/2006 | Tankard | |

FOREIGN PATENT DOCUMENTS

| | | | |
|---|---|---|---|
| EP | 0 391 647 A3 | | 10/1990 |
| EP | 0 573 198 | * | 12/1993 |
| EP | 0 573 198 A1 | | 12/1993 |

(Continued)

OTHER PUBLICATIONS

Takashi Kosaka, Fumiki Tanahashi, Nobuyuki Matsui and Masami Fujitsuna, Current Zero Cross Detection-based Position Sensorless Control of Synchronous Reluctance Motors, IEEE 2002, p. 1610-1616.*

(Continued)

*Primary Examiner*—Tung S Lau
(74) *Attorney, Agent, or Firm*—Haynes and Boone, LLP

(57) ABSTRACT

An electrical machine has a rotor position transducer which provides output signals to a control system. The output signals contain errors due to component shortcomings and manufacturing imperfections. A method is disclosed which is able to determine the errors in the signals by the use of a position detection algorithm so as to provide compensations to the control system of the machine. The compensations may be stored in the control system and used to improve the accuracy of the transducer output signals, thus improving the output of the machine.

15 Claims, 4 Drawing Sheets

FOREIGN PATENT DOCUMENTS

| | | |
|---|---|---|
| EP | 0 780 966 A2 | 6/1997 |
| EP | 1 014 556 A1 | 6/2000 |
| EP | 1 109 309 A2 | 6/2001 |

OTHER PUBLICATIONS

M. E. Hague, L. Zhong and M. F. Rahman in a Sensorless Initial Rotor Position Estimation Scheme for a Direct Torque Controlled Interior Permanent Magnet Synchronous Motor Drive (2001 IEEE, p. 879-884).*

Md. Enamul Haque, Member, IEEE, Limin Zhong, and Muhammed Fazlur Rahman in a Sensorless Initial Rotor Position Estimation Scheme for a Direct Torque Controlled Interior Permanent Magnet Synchronous Motor Drive, IEEE Transactions on Power Electronics, vol. 18, No. 6, November 2003, p. 1376-1383.*

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

* cited by examiner

Inductances

Phase A

Phase B

Phase C

Sensor signals $RPT_A$ $RPT_B$ $RPT_C$

Combined
signal

ROTOR POSITION DETECTION IN AN ELECTRICAL MACHINE

CROSS-REFERENCE TO RELATED APPLICATION

The subject matter of this application is related to the subject matter of British Patent Application No. GB 0415166.8, filed Jul. 6, 2004, priority to which is claimed under 35 U.S.C. § 119 and which is incorporated herein by reference.

BACKGROUND OF THE INVENTION

1. Field of the Invention

Embodiments of this invention relate to the compensation of errors in the rotor position detector of an electrical machine and particularly, but not exclusively, of a switched reluctance machine.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, 21-24 Jun. 1993, incorporated herein by reference. A general treatment of the drives can be found in various textbooks, e.g. "Electronic Control of Switched Reluctance Machines" by T J E Miller, Newnes, 2001, incorporated herein by reference.

FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14.

The switching must be correctly synchronized to the angle of rotation of the rotor for proper operation of the drive, and a rotor position transducer ('rpt') 15 is typically employed to supply signals corresponding to the angular position of the rotor. The rpt 15 is a device that outputs a binary signal having two transitions per machine phase period and is periodic with an electrical cycle of the machine. The transitions are indicative of events in the electrical cycle of the machine, for example occurrences of maximum and minimum inductance, or positions closely adjacent such events, in relation to which a control action is to take place. Such devices are relatively inexpensive compared with the more accurate resolvers or encoders which are typically employed on servo systems which require high positional accuracy.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A resistor 28 is connected in series with the lower switch 22 to provide a current feedback signal. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter. A polyphase system typically uses several "phase legs" of FIG. 2 connected in parallel to energize the phases of the electrical machine. Instead of the current-measuring resistor, an isolated and/or non-invasive current detector may be used.

The phase inductance cycle of a switched reluctance machine is the period of the variation of inductance for the, or each, phase, for example between maxima when the rotor poles and the relevant respective stator poles are fully aligned. An idealized form of the inductance curve for a phase is shown in FIG. 3(a). In practice, the sharp corners at $L_{min}$ and $L_{max}$ are rounded due to flux fringing and to saturation of the magnetic circuits. The maximum value of inductance would also be current dependent. Nevertheless, this curve is useful to illustrate the general behavior of the machine. As explained in more detail in the Stephenson paper cited above, the maximum inductance region, $L_{max}$, is centered around the rotor position where a pair of rotor poles are fully aligned with a pair of stator poles. This is shown for a 3-phase, 6-pole stator, 4-pole rotor machine in FIG. 3(b). Similarly, the minimum inductance region, $L_{min}$, corresponds to the position where the interpolar axis on the rotor is aligned with the stator pole axis, as shown in FIG. 3(c).

The performance of a switched reluctance machine depends, in part, on the accurate timing of phase energization with respect to rotor position. Detection of rotor position is conventionally achieved by using a rotor position transducer 15, shown schematically in FIG. 1, such as a rotating toothed disc mounted on the machine rotor, which co-operates with an optical or magnetic sensor mounted on the stator. A pulse train indicative of rotor position relative to the stator is generated and supplied to control circuitry, allowing accurate phase energization. Typically, a single sensor is used for 1- and 2-phase systems; three sensors for a 3-phase system; and either 4 or 2 sensors for a 4-phase system. Simpler arrangements using only one sensor are occasionally used in systems with three or more phases. Such position transducers have a much poorer resolution than, say, a resolver or encoder but are considerably less costly. While it is possible to use a highly accurate sensor, the cost involved would have a significant impact on the overall cost of the drive, particularly in small, low-cost drives.

FIG. 4 shows in schematic form the essential components of such a rotor position transducer (rpt) for a 3-phase system. The vane 40 has a number of castellations which equals the number of rotor poles and is proportioned so as to give an equal mark:space ratio on the outputs of the three sensors. The sensors are distributed around the perimeter of the vane at angles which correspond to the displacement angles of the inductance profiles of the phases, and are typically set relative to the stator poles to give rising and falling edges at $L_{min}$ and $L_{max}$, respectively. This results in the signals from the sensors having relationships with the inductance profiles of the phases as shown in FIG. 5. As stated above, the rpt 15 is a device that outputs a binary signal having two transitions per machine phase and is periodic with an electrical cycle of the machine. The transitions are indicative of events in the electrical cycle of the machine, for example occurrences of maximum and minimum inductance, or positions closely adjacent such events, in relation to which a control action is to take place. These signals are typically used by the control system to generate the correct instants for energization of the windings of the machine. Since the performance of the machine is critically dependent on the accuracy of such energization, it is important that the components of the rpt are accurately made and aligned.

Several sources of error are commonly found in the rpt. The mark:space ratio of the vane obviously affects the mark:space ratio of the output signal, though the relationship is not entirely straightforward, since it is also affected by the properties of the type of sensor used in the rpt. For example, if the sensor is of the optical type, it will have a finite beam width. This will influence the signal differently, depending on whether the transition is from transmitting to obscuring or vice versa. If the sensor is of the Hall-effect type, then the proximity of the incoming edge of the ferromagnetic vane will give rise to fringing of the magnetic flux and earlier switching than would be expected. In addition, both of these types of sensor can suffer from hysteresis effects, giving variations in signal output depending on the direction of rotation. In order to counter these effects, it is known to adjust the physical mark:space ratio of the vane so as to give a sensor output which is more nearly unity mark:space. It is also known to offset the alignment of the vane on the rotor in order to at least partially compensate for hysteresis, magnetization precision, beam-width and/or fringing effects. Nevertheless, it is not usually possible to compensate simultaneously for all the errors, so at least some errors usually remain in the output signals.

These errors, however, are only part of the problem. It will be evident from FIG. 4 that both the absolute position of a sensor relative to the stator and its relative position to the other sensors will affect the phase of the $RPT_A$, $RPT_B$ and $RPT_C$ signals relative to the inductance profile of their phase. Methods have therefore been developed to reduce manufacturing errors in the placement of the sensor components, which are normally arrayed on a printed circuit board. For example, U.S. Pat. Nos. 5,877,568 and 6,661,140, both incorporated herein by reference, both disclose methods of improving the alignment of the sensors with the stator, though at the expense of additional components and manufacturing processes.

Similarly, the alignment of the vane relative to the rotor poles affects the phase relationship of the rpt signals to the respective inductance profiles. Among known methods for reducing this error is that disclosed in U.S. Pat. No. 5,786,646, incorporated herein by reference, which uses a specially designed clamp ring and appropriate tooling to fix the vane in a known relationship with the rotor poles.

These methods, while going at least some way to improving the quality of the rpt output, are expensive in terms of added components, manufacturing processes and/or set-up costs. While this may be acceptable in high-value drives manufactured in low volumes, it is not desirable for low-cost, high-volume drives as used in, e.g., domestic appliances or automotive systems. Nevertheless, such low-cost systems still require accurate rpt signals to produce the high output required of them. There is therefore a need to compensate for the error in the rpt signals in a repeatable and cost-effective way.

SUMMARY OF THE INVENTION

The skilled person in the art will be aware that it is not actually necessary to have a physical rpt as exemplified in FIG. 4. Methods of predicting the rotor position by use of a software algorithm have been developed. These are referred to in the art as "sensorless" methods, though in practice they all require a sensor of some sort to provide feedback signals from the drive to supply data to the algorithm. Typically, phase current measurement is required, as disclosed in, e.g., U.S. Pat. No. 6,586,903 (Moriarty), incorporated herein by reference, and often a measurement of voltage or flux-linkage is also required, as disclosed in, e.g., U.S. Pat. No. 5,467,025 (Ray), incorporated herein by reference. Current could be measured in a variety of ways, e.g. by a non-invasive, isolated device such as shown as reference 18 in FIG. 1 or by a non-isolated device such as shown by the resistor 28 in FIG. 2. While in some drives current measurement would already be provided for over-current protection of the switching devices and possibly also for chopping control, small drives may not require them, since the current is resistively limited by the resistance of the phase windings and the voltage drops across the switches. In such drives, especially low-voltage drives, inclusion of a current sensing resistor would be positively detrimental to performance, while an isolated current transducer is likely to be ruled out on cost grounds. Designers of low-cost, low-voltage drives are therefore precluded from using sensorless position detection and are forced to accept the limitations imposed by a physical rpt.

The techniques discussed in this patent application are quite distinct from compensations used in resolver or encoder systems. Such systems have high resolution over a mechanical revolution. Compensation for their circumferential misalignment to a shaft can be done by reading, say, the encoder output at two positions and noting the offset in its output, which may be a few counts of position, but can never be less than the resolution of the encoder. Embodiments of this invention, however, allow correction of an error which is much less than the resolution of the rpt (but still significant with respect to the performance of the drive system).

Embodiments of the invention effectively compare the output from the rpt with the output of a sensorless position detection algorithm to determine the error in the rpt signals. This comparison can be done at the end of the manufacturing process. The error is then loaded into the control system of the drive so that, when the drive is operating normally in its intended application, it is controlled by signals from the rpt which are compensated for error. The signals from the rpt and the sensorless rotor position detection algorithm are generally produced effectively simultaneously.

In one particular form the first signals from the rotor position transducer and second signals from the sensorless position detection algorithm are compared to produce an error value.

Generally, the electrical machine will be controlled by its own control means and according to one embodiment the error value is stored in the control means for use in compensating for rotor position transducer error. Furthermore, the sensorless position detection algorithm can also be stored in the control means. In this way, the calibration technique is part of the drive system of the electrical machine. The determination of error can then be carried out at any time after the electrical machine has been manufactured, for example after it has been delivered to an operating site. This makes embodiments of the present invention useful for repeated calibration rather than simply as a one-off technique for compensating for error immediately after manufacture. However, method embodiments of the invention can also be carried out separately from the control software dedicated to operation of the machine.

In determining error according to embodiments of the invention, the machine can be operated as a motor or as an electrical generator. It may be a rotary machine or a linear machine.

Embodiments of the invention also extend to an electric machine drive system comprising an electric machine having a moving part in relation to which the rpt is arranged to produce the first signals.

BRIEF DESCRIPTION OF THE DRAWINGS

Embodiments of the invention will be described with respect to the figures, in which like reference numerals denote like elements, and in which.

DETAILED DESCRIPTION

The illustrative embodiment to be described uses a 3-phase switched reluctance drive in the motoring mode, but any phase number could be used, with the drive in either motoring or generating mode, i.e. producing output as a torque or force, or as electrical power, respectively.

Figure 1:
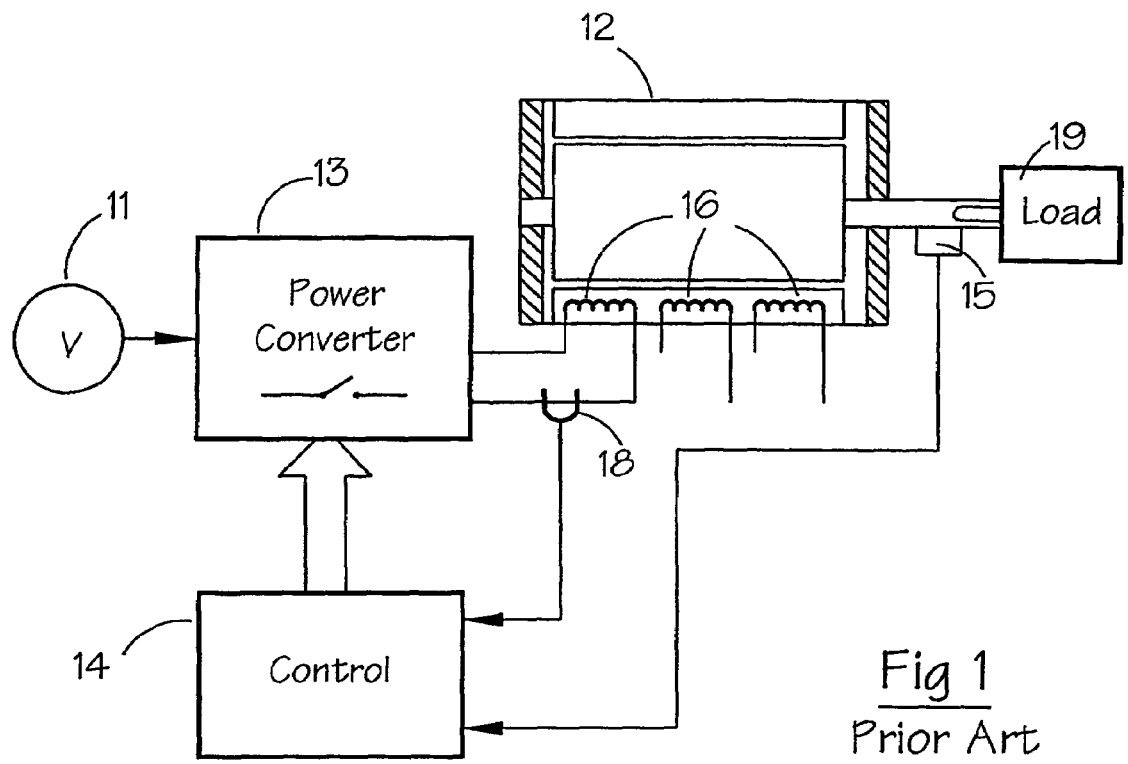
FIG. 1 shows a typical prior art switched reluctance drive.
Figure 2:
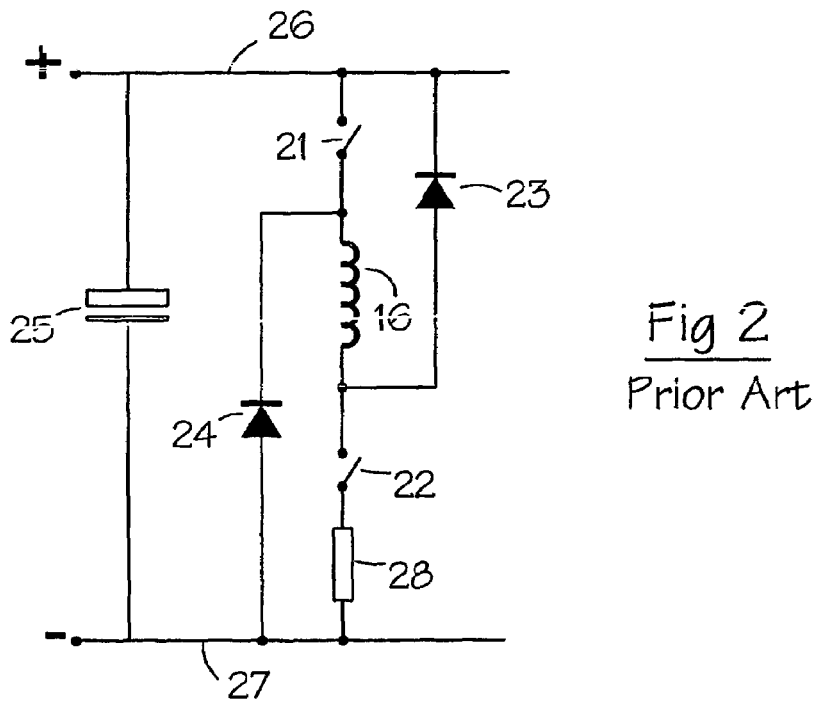
FIG. 2 shows a known topology of one phase of the converter of FIG. 1.
Figure 3A:
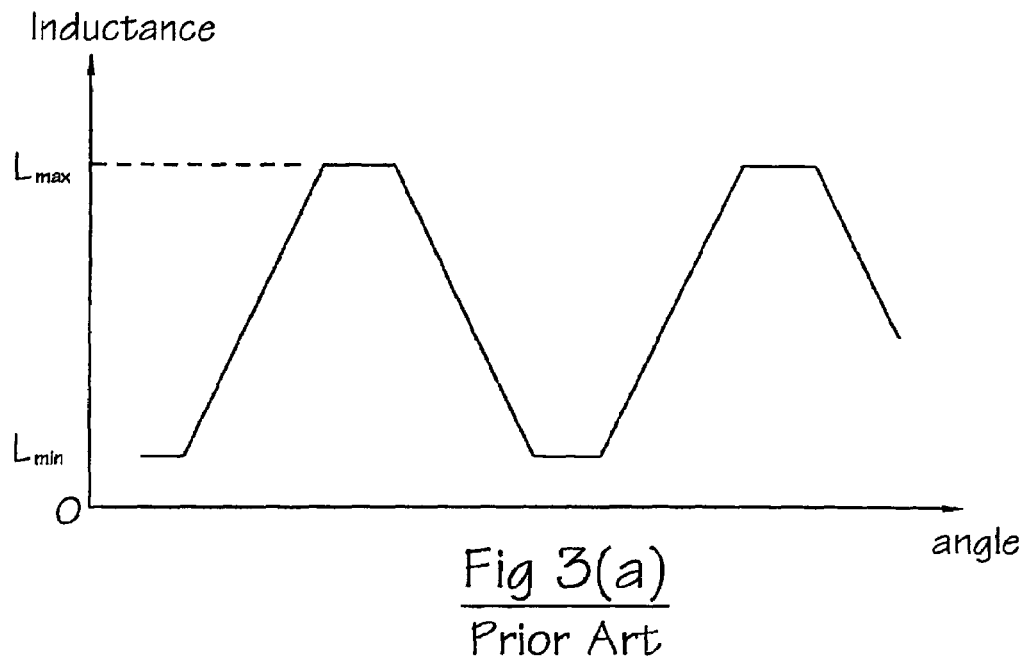
FIG. 3(a) shows an inductance profile of a switched reluctance machine as a function of rotor angle.
Figure 3B:
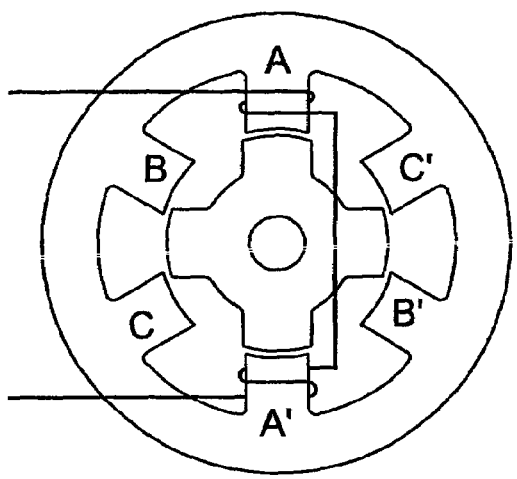
FIG. 3(b) shows a schematic view of a switched reluctance machine with the rotor in the fully aligned ($L_{max}$) position for Phase A.
Figure 3C:
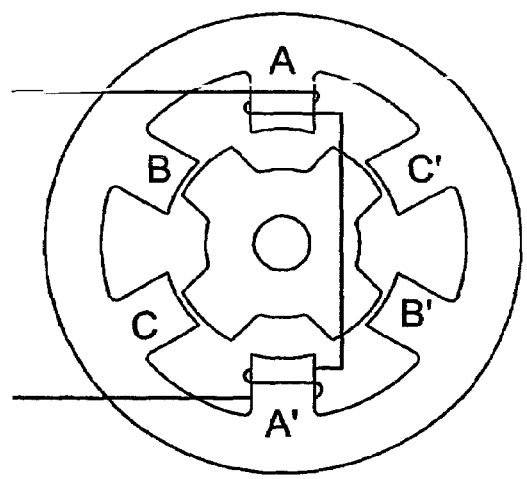
FIG. 3(c) shows a schematic view of a switched reluctance machine with the rotor in the fully unaligned ($L_{min}$) position for Phase A.
Figure 4:
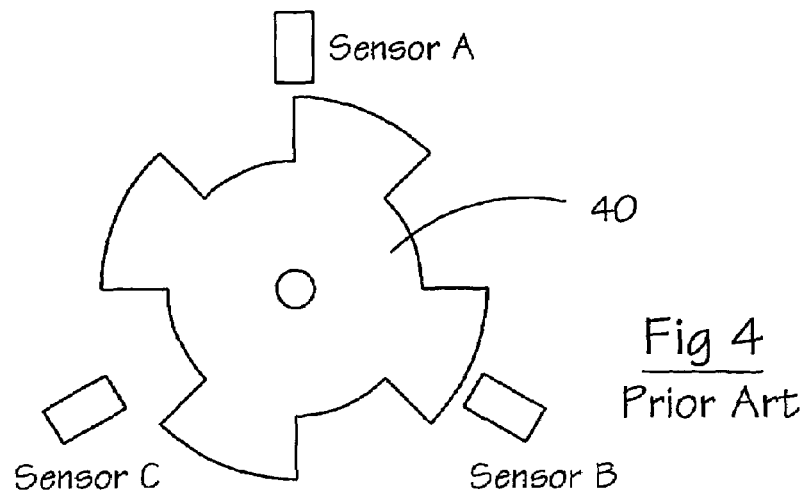
FIG. 4 shows the elements of a rotor position transducer for a 3-phase system.
Figure 6:
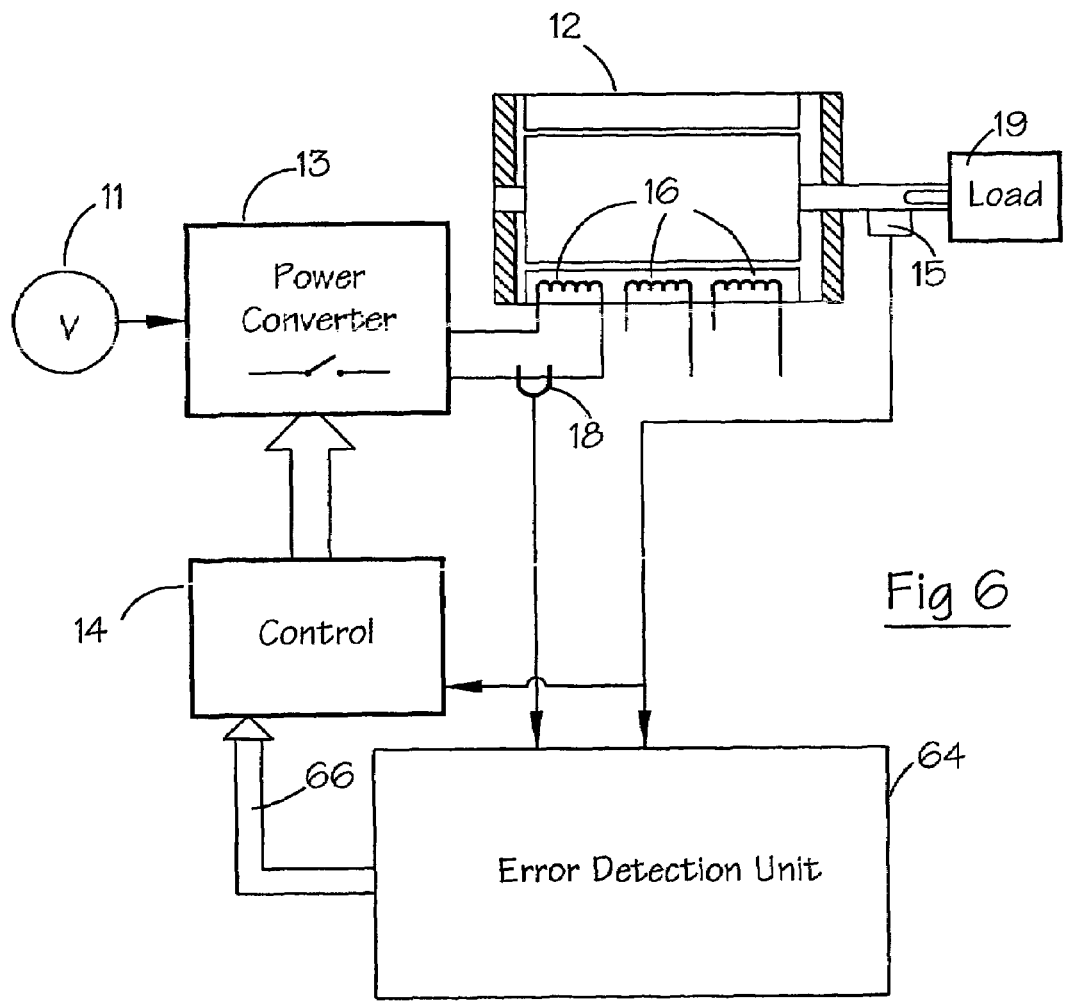
FIG. 6 shows an apparatus according to one embodiment of the invention.
Figure 5:
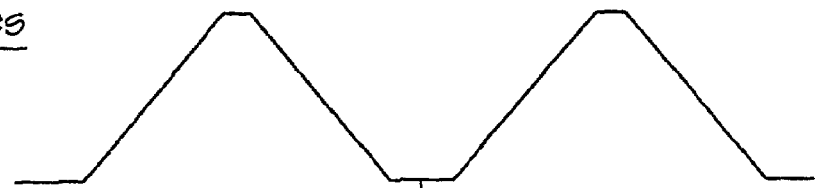
FIG. 5 shows the relationship between the inductance profiles and sensor signals for the transducer of FIG. 4.
Figure 5:
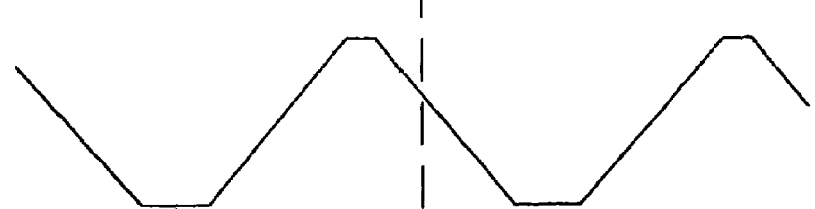
Figure 5:
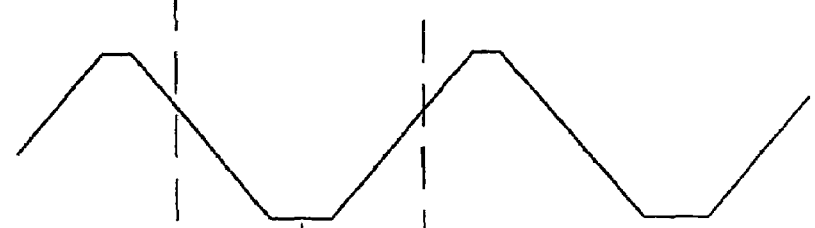
Figure 5:
Figure 5:
Figure 5:
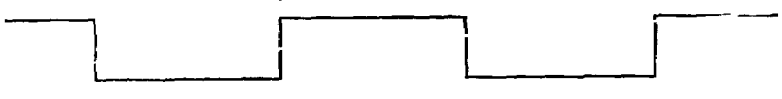
Figure 5:
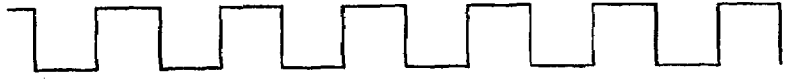

Referring to FIG. 6, a switched reluctance ('SR') drive as shown in FIG. 1 is set up to be run in association with an error detection unit 64. The rpt is as shown in FIG. 1, typically with an output relationship to the inductance cycle for each phase of the machine as shown in FIG. 5. The rpt has two transitions between binary output states, as shown in FIG. 5, and the signals from the rpt are fed to the error detection unit 64 as well as to the control system 14 of the drive. The error detection unit 64 is able to determine the current in at least one of the phases of the machine, by means of current sensor 18. Signals from other current sensors associated with other phases may optionally be supplied to the error detection unit 64.

FIG. 6 shows the motor connected to a load 19. In practice, this load can be omitted for ease of test. Alternatively, it can be a simple flywheel attached to the shaft to increase the inertia and reduce speed ripple, or it can be a conventional load which requires torque from the motor. In the latter case, the increased phase currents may allow more accurate determination of rotor position and hence more accurate determination of the errors in the rpt. If the test is to be done in the generating mode, the load 19 should be capable of providing torque to the SR machine 12.

In one embodiment of the invention, the machine 12 is run by its own power converter 13 using control unit 14, responsive to signals from rpt 15. It is not then necessary to provide current feedback to control unit 14. At the same time, the error detection unit 64 runs a sensorless position detection algorithm using whatever feedback signals the algorithm requires. Generally these signals will include phase current feedback from current detector 18. They may also include dc link voltage or applied phase voltage.

Examples of the sensorless position detection algorithm which can be used include: predictor/corrector methods, such as described in European Patent Application No. 0573198 (Ray); diagnostic pulse scheme, such as described in European Patent Application No. 1014556 (Green); a current waveshape detection algorithm, such as that described in European Patent Application No. 0780966 (Watkins) or European Patent Application No. 1109309 (Moriarty); an inductance profile interrogation algorithm; etc. All of these European patent applications are incorporated herein by reference. It will be clear to the skilled person that the exact method of sensorless detection is not necessarily germane to the invention.

When the machine is running in a stable condition and reliable estimates of position are obtained from the sensorless position detection algorithm, the error detection unit is able to compare the estimated position with the signals produced simultaneously by the rpt to form an estimate of the error. This error can then be transmitted to the control unit 14 through data bus 66 and stored in the control system. When the drive system is subsequently operated in its intended application, the control system then uses the stored error to compensate the output of the rpt and provide improved performance from the drive.

In a further embodiment of the invention, the drive is run by the control system 14 under the influence of the sensorless position detection algorithm. Signals from both this algorithm and from the rpt are fed to the error detection unit 64 and an estimate of the error is produced, as before.

Thus the apparatus shown in FIG. 6 can be used for a one-off analysis of a drive system at the end of its manufacture to determine the error(s) in the rpt system and to provide a means of permanently compensating them. This is achieved without additional or specialized components. A permanently installed current sensor is not required. Instead of the prior art methods of seeking to minimize the error in the rpt signals, embodiments of the invention accept that such errors occur and compensate for them so as to optimize the performance of the drive.

A value of error may be stored and used for all the phases to save time on analysis, or the procedure can be repeated with a second or more phases in the machine 12 so as to produce and store either several readings which may be averaged or one individual value of error for each phase. Similarly, the process can be carried out on only one transition of the rpt signal or on several or all, allowing either an average error to be calculated or storage of the actual error associated with each signal edge.

The stored error value(s) derived from the rpt calibration carried out is then applied by the machine control unit to the actual rpt signal transitions to compensate for inherent error in the signals. It will be apparent to those skilled in the art of digital signal processing upon reading this patent application that the compensation of the errors in the rpt signals could be achieved in a variety of ways once the basic rpt calibration has been performed. This could include, for example, compensation of errors in both rising edges and falling edges in the rpt signal.

It will be appreciated that the compensation for the error could be done in either the rotor angle domain or in the time domain and the choice between the two would be influenced by the particular control implementation used by the subject system. The ultimate goal, however, remains that of ensuring that the switches controlling the phase winding(s) are operated at the correct moments and that the operation is not compromised by any error in the rpt signal(s).

It will also be appreciated by those skilled in the art that the error detection unit 64 could, to a greater or lesser degree, be integrated with the control system of the drive 14 (see FIG. 1). Thus, it may be possible to employ the processing power of the control system to perform the necessary calculations and to store the resulting values of rpt error. Such an embodiment would allow the drive to be re-calibrated in its application if the settings of the rpt were disturbed during maintenance or repair. The re-calibration exercise could provide a new set of errors to be stored and subsequently used for compensation of the rpt output signals.

The skilled person will appreciate that variations of the disclosed arrangements are possible without departing from the invention, particularly in the details of the implementation of the algorithms in the error detection unit. It will also be apparent that, while the technique has been described in relation to a switched reluctance machine, it can be used in relation to any machine using rotor position information in its control. Furthermore, while embodiments of the invention use signals produced by the rpt and the sensorless rotor position detection algorithm simultaneously, it is possible to carry out the error determination by running the machine in separate equivalent cycles using each position determination system separately.

Also, while embodiments of the invention have been described in terms of a rotating machine, embodiments of the invention are equally applicable to a linear machine having a stator in the form of a track and a moving part moving on it. The word 'rotor' is used in the art to refer to the movable part of both rotating and linear machines and is to be construed herein in this way. Accordingly, the above description of several embodiments is made by way of example and not for the purposes of limitation.

What is claimed is:

1. A method comprising:
   determining error in the output of a rotor position transducer that directly detects a position of a rotor of an electrical machine and that outputs first signals, the determining including:
   operating the electrical machine so as to produce the first signals and to produce, from a sensorless position detection algorithm, second signals representing an estimate of the position of the rotor, the sensorless position detection algorithm producing the second signals independently of and without reference to the first signals; and
   comparing the first and second signals to produce an error value representing the error in the output of the rotor position transducer; and storing the error value;
   wherein the rotor position transducer provides binary first signals and is arranged in relation to the rotor of the electrical machine to produce no more than two transitions in the binary first signals in a phase inductance cycle.

2. A method as claimed in claim 1 in which the electrical machine is controlled by a controller, and wherein the storing of the error value includes storing the error value in the controller.

3. A method as claimed in claim 1 in which the machine is operated as an electrical generator when determining the error.

4. A method as claimed in claim 1 in which the machine is operated as a motor when determining the error.

5. A method as claimed in claim 1 in which the sensorless position detection algorithm is selected from the group consisting of a predictor/corrector model, a diagnostic pulse scheme, a current wave shape detection algorithm, and an inductance profile interrogation algorithm.

6. A method as claimed in claim 1, including using the stored error value to compensate the first signals for error therein.

7. A method as claimed in claim 1, including selecting as the electrical machine a switched reluctance machine.

8. A method as claimed in claim 2 in which the sensorless position detection algorithm is stored in the controller.

9. Apparatus comprising:
   a rotor position transducer that directly detects a position of a rotor of an electrical machine and that outputs first signals;
   means for carrying out a sensorless position detection algorithm that produces second signals representing an estimate of the position of the rotor, the sensorless position detection algorithm producing the second signals independently of and without reference to the first signals;
   control means for operating the electrical machine so as to produce the first and second signals; and
   means for comparing the first and second signals to produce an error value representing error in the output of the rotor position transducer;
   wherein the rotor position transducer provides binary first signals and is arranged in relation to the rotor of the electrical machine to produce no more than two transitions in the binary signals in a phase inductance cycle of the machine.

10. Apparatus as claimed in claim 9 in which the control means for operating the machine is operable to store the error value.

11. Apparatus as claimed in claim 9 in which the control means is operable to use the error value in relation to the first signals from the rotor position transducer as error compensation.

12. Apparatus as claimed in claim 9 in which the control means is operable to operate the machine as an electrical generator or a motor.

13. An electric machine drive comprising apparatus as claimed in claim 9 and an electric machine having a moving part in relation to which the rotor position transducer is arranged to produce the first signals.

14. Apparatus as claimed in claim 9 wherein the machine is a switched reluctance machine.

15. Apparatus as claimed in claim 10 in which the means for carrying out the sensorless position detection algorithm is part of the control means for operating the machine.

* * * * *